United States Patent [19]
Ambrose et al.

[11] Patent Number: 6,046,276
[45] Date of Patent: Apr. 4, 2000

[54] POWDER COATING COMPOSITIONS CONTAINING FUNCTIONAL POLYSILOXANES

[75] Inventors: Ronald R. Ambrose, Allison Park; Truman F. Wilt, Clinton; Anthony M. Chasser, Allison Park; John R. Schneider, Glenshaw, all of Pa.

[73] Assignee: PPG Industries Ohio, Inc., Cleveland, Ohio

[21] Appl. No.: 08/995,790

[22] Filed: Dec. 22, 1997

Related U.S. Application Data

[63] Continuation-in-part of application No. 08/904,597, Aug. 1, 1997, Pat. No. 5,939,491.

[51] Int. Cl.$^7$ .................................................. C08J 3/24
[52] U.S. Cl. ...................... 525/101; 525/100; 525/107; 528/26; 528/27
[58] Field of Search ................... 525/100, 101, 525/107; 528/26, 27

[56] References Cited

U.S. PATENT DOCUMENTS

| | | | |
|---|---|---|---|
| 3,398,174 | 8/1968 | Barnes | 260/448.2 |
| 4,025,456 | 5/1977 | Litteral et al. | 252/351 |
| 4,431,789 | 2/1984 | Okazaki et al. | 528/15 |
| 5,214,101 | 5/1993 | Pettit, Jr. et al. | 525/176 |
| 5,248,789 | 9/1993 | Wolff | 549/215 |
| 5,260,469 | 11/1993 | Swiatek | 556/445 |
| 5,432,233 | 7/1995 | Miyazoe et al. | 525/103 |
| 5,536,785 | 7/1996 | Foukes et al. | 525/176 |
| 5,614,640 | 3/1997 | Okawa | 549/215 |

FOREIGN PATENT DOCUMENTS 1293331  10/1972  United Kingdom.

OTHER PUBLICATIONS

"Synthesis of Novel Organic Oligomers Containing Si–H Bonds", T. Iwahara, M. Kusakabe, M. Chiba and K. Yonezawa, Journal of Polymer Science: Part A: Polymer Chemistry, vol. 31, pp. 2617–2631 (1993), John Wiley & Sons, Inc.

"Siloxanes with aliphatic isocyanate groups, A tetrafunctional cross–linking agent", Guangbin Zhou and Richard Fragnito, Johannes Smid, Polymer Bulletin 22, pp. 85–88 (1989), Springer–Verlag.

"Regioselective Rhodium–Containing Catalysts for Ring–Opening Polymerizations and Hydrosilylations", J.V. Crivello and M. Fan, Journal of Polymer Science: Part A: Polymer Chemistry, vol. 30, pp. 1–11 (1992), John Wiley & Sons, Inc.

*Primary Examiner*—Bernard Lipman
*Assistant Examiner*—Caixia Lu-Rutt
*Attorney, Agent, or Firm*—William J. Uhl

[57] ABSTRACT

Improved powder coating compositions containing novel polysiloxanes having various reactive functional groups are disclosed. The compositions are particularly useful as thermosetting powder coating compositions where they provide excellent filiform corrosion resistance.

6 Claims, No Drawings

POWDER COATING COMPOSITIONS CONTAINING FUNCTIONAL POLYSILOXANES

This is a Continuation in Part of application Ser. No. 08/904,597, filed on Aug. 1, 1997, now U.S. Pat. No. 5,939,491.

BACKGROUND OF THE INVENTION

The present invention relates to an improved powder coating composition comprising a solid particulate film-forming mixture of a polymer containing reactive functional groups and a curing agent having functional groups reactive with the functional groups of the polymer, which components are well known in the art, wherein the improvement comprises an organic polysiloxane having various reactive functional groups reactive with the functional groups of the polymer and/or the curing agent. More particularly, this invention relates to improved powder coating compositions which provide enhanced filiform corrosion resistance.

Powder coating compositions for use in painting are extremely desirable. Such coating compositions greatly reduce and can even eliminate the organic solvents used in liquid paints. When the powder coating composition is thermally cured, little, if any, volatile material is given off to the surrounding environment. This is a significant advantage over liquid paints in which organic solvent is volatilized into the surrounding atmosphere when the paint is cured by heating.

A particular problem which often results from the use of powder coatings, particularly over aluminum substrates, is filiform corrosion which is a type of localized corrosion that affects painted metals (usually steel, aluminum and magnesium). Filiform corrosion generally occurs in wet environments at the site of a surface defect in the presence of soluble ionic species. As described in *Filiform Corrosion in Polymer-coated Metals*, A. Bautista, PROGRESS IN ORGANIC COATINGS 28 at pages 49–58 (1996), this deterioration process gives rise to corrosion products which are characterized by a filamentous, worm-like appearance under the coatings. The "filaments" typically exhibit an arborescent structure and grow directionally under the coating.

As filiform corrosion results in delamination of an organic coating from a metal substrate, thereby exposing the metal to the environment, it has become a matter for increasing concern in the areas of automotive, industrial and architectural coatings. Accordingly, it is desirable to provide a powder coating composition with improved filiform corrosion. It has been found that incorporation of certain organic polysiloxanes having functional groups reactive with the functional groups of the polymer and/or the curing agent improves the filiform corrosion resistance of the powder coating composition.

Polysiloxanes with hydroxyl functional groups (i.e., polysiloxane polyols) are well known in the art. Japanese Patent Publication 48-19941 describes polysiloxane polyols which are obtained by the dehydrogenation reaction between a polysiloxane hydride and an aliphatic polyhydric alcohol or polyoxyalkylene alcohol to introduce the alcoholic hydroxy groups onto the polysiloxane backbone. In practice, however, it is difficult to obtain an industrially significant yield of such polysiloxane polyols because such a hydrosilylation reaction readily gels. Another problem encountered with this hydrosilylation reaction is the difficulty in obtaining a solvent capable of dissolving both reactants. Strongly hydrophilic alcohols such as polyglycerols are highly soluble in alcohols and water, but insoluble in hydrocarbon solvents. Polysiloxanes, however, are generally only soluble in hydrocarbon solvents such as toluene or n-hexane.

U.S. Pat. No. 4,431,789 to Okazaki et al. discloses a polysiloxane polyol which is obtained by the hydrosilylation reaction between a polysiloxane containing silicon hydride and a polyglycerol compound having an aliphatically unsaturated linkage in the molecule. Examples of such polyglycerol compounds are those obtained by the reaction of allyl alcohol and glycidol or by the reaction of diglycerin and allyl glycidyl ether. This reaction, a so-called hydrosilylation reaction, is the addition reaction between an organosilicon compound having a hydrogen atom directly bonded to the silicon atom, i.e., a polysiloxane hydride, and an organic compound having aliphatic unsaturation in the molecule carried out in the presence of a catalytic amount of a Group VIII noble metal. The hydrosilylation reaction can proceed readily in the presence of an alcoholic solvent which can dissolve both reactants. The resulting polysiloxane polyols are useful in coatings as non-ionic surface active agents.

U.S. Pat. No. 5,260,469 discloses butoxylated polysiloxane polyols which are disclosed as being useful in cosmetics. U.S. Pat. No. 5,248,789 discloses epoxy functional polysiloxanes which are formed by reacting a polysiloxane-containing silicon hydride with allyl glycidyl ether.

Pending U.S. patent application Ser. No. 08/904,598 U.S. Pat. No. 5,916,992 discloses polysiloxane polyols obtained by the hydrosilylation of a polysiloxane containing silicon hydride with an alkenyl polyoxyalkylene alcohol. These polysiloxane polyols can contain two or more primary hydroxyl terminal functional groups per pendant group.

Pending U.S. patent application Ser. No. 08/904,596 U.S. Pat. No. 5,952,443 discloses acetoacetate functional polysiloxanes and coating compositions containing such. The acetoacetate functional polysiloxanes are obtained by the transesterification of a polysiloxane polyol with an acetoacetate. The coating composition taught by this reference comprises an acetoacetate functional polysiloxane, a polyamine or blocked polyamine, and, optionally a polyacrylate curing agent. This coating composition is liquid in form and typically prepared as a two-pack, ambient-cured system.

Pending U.S. patent application Ser. No. 08/904,597 discloses curable compositions comprising an organic polysiloxane containing various reactive functional groups and a curing agent containing functional groups which are reactive with the functional groups of polysiloxane. The organic polysiloxanes of this reference contain reactive functional groups such as OH, COOH, NCO, carboxylate, primary and secondary amine, amide, carbamate and epoxy functional groups.

These polysiloxanes are obtained by further reacting the hydroxyl groups of the polysiloxane polyols with other groups to provide various reactive functional groups pendant from the polysiloxane backbone. Such reactive functional groups allow incorporation of the polysiloxane moiety into curable compositions which can contain a variety of reactive components, including a variety of curing agents.

SUMMARY OF THE INVENTION

The powder coating composition of the invention comprises a solid particulate film-forming mixture of (a) a polymer containing reactive functional groups and (b) a curing agent having functional groups reactive with the functional groups of the polymer, such mixture as is well known in the art, wherein the improvement comprises (c) an organic polysiloxane having reactive functional groups which are reactive with the functional groups of (a) and/or (b), said polysiloxane having the following general structural formula:

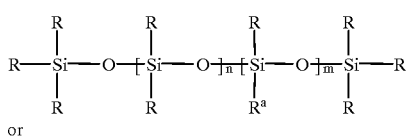

(I)

or

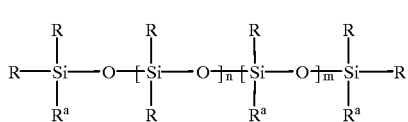

(II)

where m is at least 1; m' is 0 to 50; n is 0 to 50; the R groups are monovalent hydrocarbon group connected to the silicon atoms; $R^a$ has the following structure:

$$R_1\text{—O—X} \tag{III}$$

wherein $R_1$ is alkylene, oxyalkylene or alkylene aryl; and X is a moiety containing a functional group selected from the group consisting of OH, COOH, NCO, carboxylate such as ester, carbonate and anhydride, primary amine, secondary amine, amide, thiol, carbamate, and epoxy functional groups.

DETAILED DESCRIPTION OF THE INVENTION

In the structural formulas of (I) and (II), the various R groups can be the same or different, and it is usually the case that the R groups will be mixed monovalent hydrocarbon groups.

By monovalent hydrocarbon groups is meant organic groups containing essentially carbon and hydrogen. The hydrocarbon groups may be aliphatic, aromatic, cyclic or acyclic and may contain from 1 to 24 (in the case of aromatic from 3 to 24) carbon atoms. Optionally, the hydrocarbon groups may be substituted with heteroatoms, typically oxygen. Examples of such monovalent hydrocarbon groups are alkyl, alkoxy, aryl, alkaryl or alkoxyaryl groups.

By alkylene is meant acyclic or cyclic alkylene groups having a carbon chain length of from $C_2$ to $C_{25}$. Examples of suitable alkylene groups are those derived from propene, butene, pentene, 1-decene, isoprene, myrcene and 1-heneicosene. By oxyalkylene is meant an alkylene group containing at least one ether oxygen atom and having a carbon chain length of from $C_2$ to $C_{25}$, preferably of from $C_2$ to $C_4$. Examples of suitable oxyalkylene groups are those associated with trimethylolpropane monoallylether, pentaerythritol monoallylether, trimethylolpropane diallylether, polyethoxylated allyl alcohol and polypropoxylated allyl alcohol. By alkylene aryl is meant an acyclic alkylene group containing at least one aryl group, preferably phenyl, and having an alkylene carbon chain length of from $C_2$ to $C_{25}$. The aryl group may optionally be substituted. Suitable substituent groups may include hydroxyl, benzyl, carboxylic acid and aliphatic groups. Examples of suitable alkylene aryl groups include styrene and 3-isopropenyl-α,α-dimethylbenzyl isocyanate.

Formulae (I) and (II) are diagrammatic, and it is not intended to imply that the parenthetical portions are necessarily blocks, although blocks may be used where desired. In many cases the compound is more or less random, especially when more than a few siloxane units are employed and when mixtures are used. In those instances where more than a few siloxane units are used and it is desired to form blocks, oligomers are first formed and then these are joined to form the block compound. By judicious choice of reactants, compounds having an alternating structure or blocks of alternating structure may be used.

As mentioned above, the powder coating composition is preferably a thermosetting composition comprising:

(a) at least one film-forming polymer which contains reactive functional groups;

(b) a curing agent containing functional groups which are reactive with the functional groups of said polymer; and (c) an organic polysiloxane which contains functional groups which are reactive with the functional groups of (a) and/or (b), said polysiloxane having the general structural formula (I) or (II), where m, m', n, R, $R_1$, $R_a$ and X are as described above. Preferably, n+m and n+m' is 2 or 3.

The reactive functional groups of (a) and (c) can be the same or different, but preferably both are reactive with the functional groups of the curing agent (b). Examples of such reactive functional groups of (a) and/or (c) include OH, COOH, NCO, carboxylate, such as ester, carbonate and anhydride groups, primary amine, secondary amine, amide, thiol, carbamate and epoxy functional groups.

Polysiloxanes Containing Reactive Functional Groups

In a preferred embodiment of the invention, X is a moiety which contains COOH functional groups. More preferably, when X is a group containing COOH functional groups, the organic polysiloxane is the reaction product of the following reactants:

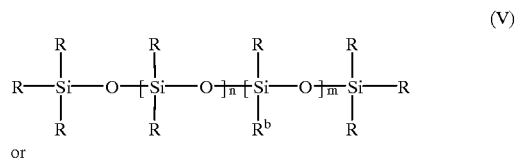

(V)

or

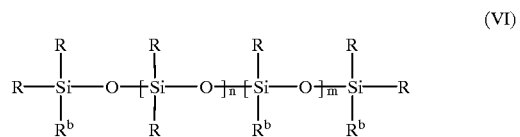

(VI)

where m is at least 1; m' is 0 to 50; n is 0 to 50; the R groups are monovalent hydrocarbon groups connected to the silicon atoms; $R^b$ has the following structure:

$$R_1\text{—O—Y} \tag{VII}$$

wherein $R_1$ is alkylene, oxyalkylene or alkylene aryl; and Y is H, mono-hydroxy substituted alkylene or oxyalkylene, or has the following general structural formula:

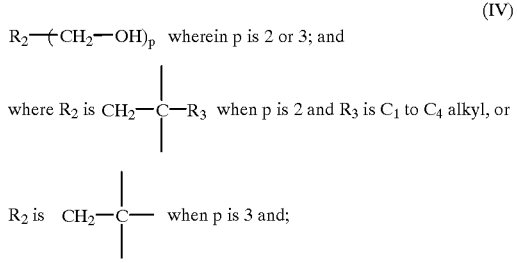

(IV) $R_2\text{—}(CH_2\text{—}OH)_p$ wherein p is 2 or 3; and where $R_2$ is $CH_2\text{—}\underset{|}{\overset{|}{C}}\text{—}R_3$ when p is 2 and $R_3$ is $C_1$ to $C_4$ alkyl, or $R_2$ is $CH_2\text{—}\underset{|}{\overset{|}{C}}\text{—}$ when p is 3 and;

Examples of anhydrides, suitable for use in the present invention as reactant (b) immediately above include hexahydrophthalic anhydride, methyl hexahydrophthalic anhydride, phthalic anhydride, trimellitic anhydride, succinic anhydride, chlorendic anhydride, alkenyl succinic anhydride and substituted alkenyl anhydrides such as octenyl succinic anhydride and mixtures thereof.

In another embodiment of the invention, X is a moiety which contains epoxy functional groups. Preferably, when X is a group containing epoxy functional groups, the organic polysiloxane is the reaction product of the following reactants:

(a) a polysiloxane polyol having the structure of formula (V) or (VI), where m, m', n, R, $R^b$ and Y are as described above for these structures; and (b) at least one polyepoxide, preferably an aliphatic or cycloaliphatic polyepoxide, or mixtures thereof.

Examples of polyepoxides suitable for use in the present invention as reactant (b) immediately above are those well known in the art, such as those described in U.S. Pat. No. 4,681,811 at col. 4, line 52 to col. 5, line 50, hereby incorporated by reference.

In yet another embodiment of the invention, X is an oligomeric or polymeric urethane or urea-containing material which is terminated with NCO, OH, primary amine or secondary amine functional groups. When X is such a moiety, the organic polysiloxane is the reaction product of the following reactants:

(a) a polysiloxane polyol having the structure of formula (V) or (VI), where m, m', n, R, $R^b$ and Y are as described above for these structures;

(b) at least one polyisocyanate; and (c) optionally at least one compound having at least 2 active H atoms per molecule selected from the group consisting of hydroxyl, primary amine and secondary amine.

Examples of polyisocyanates suitable for use in the present invention as reactant (b) immediately above are commonly known in the art, such as those described in U.S. Pat. No. 4,046,729 at col. 5, line 26 to col. 6, line 28, hereby incorporated by reference. Preferred are aliphatic or cycloaliphatic diisocyanates, or mixtures thereof.

Examples of compounds having at least 2 active H atoms per molecule, are polyols and polyamines containing primary and/or secondary amines. Examples of polyols suitable for use in the present invention as reactant (c) immediately above are well known in the art, such as those described in U.S. Pat. No. 4,046,729 at col. 7, line 52 to col. 10, line 35, hereby incorporated by reference. Examples of polyamines suitable for use in the present invention as reactant (c) immediately above are well known in the art, such as those described in U.S. Pat. No. 4,046,729 at col. 6, line 61 to col. 7, line 32, and in U.S. Pat. No. 3,799,854 at col. 3, lines 13 to 50, both hereby incorporated by reference.

Reaction conditions and the ratio of the reactants (a), (b) and (c) are selected so as to form the desired terminal group.

In another embodiment of the invention, X is an oligomeric or polymeric ester-containing moiety which is terminated with OH or COOH functional groups. When X is such a group, the organic polysiloxane is the condensation reaction product of the following reactants:

(a) a polysiloxane polyol having the structure of formula (V) or (VI), where m, m', n, R, $R^b$ and Y are as described above for these structures;

(b) at least one COOH group containing material; and (c) at least one organic polyol.

Examples of COOH containing groups suitable for use in the present invention as reactant (b) immediately above are carboxylic acid group containing polymers well known in the art, such as those described in U.S. Pat. No. 4,681,811 at col. 6, line 38; col. 7, line 33; col. 7, line 47; and col. 8, line 2, hereby incorporated by reference. Preferred are aliphatic and cycloaliphatic polycarboxylic acids and mixtures thereof.

Examples of organic polyols suitable for use in the present invention as reactant (c) immediately above are polymeric polyols well known in the art, such as those described in U.S. Pat. No. 4,798,746 at col. 3, line 20 to col. 5, line 61, hereby incorporated by reference.

In still another embodiment of the invention, X is a moiety which contains carbamate functional groups. Preferably, when X is such a moiety, the organic polysiloxane is the reaction product of the following reactants:

(a) a polysiloxane polyol having the structure of formula (V) or (VI), where m, m', n, R, $R^b$ and Y are as described above for these structures; and (b) at least one compound selected from the group consisting of alkyl carbamate, isocyanic acid, urea, and mixtures thereof, preferably alkyl carbamate.

Reaction conditions and the ratio of the reactants (a), (b) and (c) are selected so as to form the desired terminal group. The various materials used to form the functional group containing polysiloxanes of the present invention are selected such that the resultant material has a high glass transition temperature ($T_g$), i.e., greater than 30° C. The $T_g$ of the polymer can be calculated as described by Fox in *Bull. Amer. Physics. Soc.*, 1,3 page 123 (1956). The $T_g$ can also be measured experimentally and differential scanning calorimetry can be used (rate of heating 10° C. per minute, $T_g$ taken at the first inflection point). Unless otherwise indicated, the stated $T_g$ as used herein refers to the calculated $T_g$.

Polymers Containing Functional Groups

The powder coating compositions of the present invention comprise polymers containing functional groups such as hydroxyl, carboxylic acid, carbamate, amide and carboxylate functional groups.

The use in powder coatings of acrylic, polyester, polyether and polyurethane oligomers and polymers having hydroxyl functionality is well known in the art. Monomers for the synthesis of such oligomers and polymers are chosen such that the resulting oligomers and polymers have a $T_g$ greater than 50° C. Examples of such oligomers and polymers having hydroxyl functional groups suitable for use in the powder coating compositions of the present invention are those described in U.S. Pat. No. 5,646,228 at column 5, line 1 to column 8, line 7, incorporated by reference herein.

The use in powder coatings of acrylic polymers having carboxylic acid functionality is well known in the art. Monomers for the synthesis of the acrylic polymers having carboxylic acid functionality suitable for use in the powder coating compositions of the present invention are chosen such that the resulting acrylic polymer has a $T_g$ greater than 40° C. Examples of carboxylic acid group containing acrylic polymers are those described in U.S. Pat. No. 5,214,101 at col. 2, line 59 to col. 3, line 23, hereby incorporated by reference.

The use in powder coatings of polyester polymers having carboxylic acid functionality is well known in the art. Monomers for the synthesis of the polyester polymers having carboxylic acid functionality suitable for use in the powder coating compositions of the present invention are chosen such that the resulting polyester polymer has a $T_g$ greater than 50° C. Examples of carboxylic acid group containing polyester polymers are those described in U.S. Pat. No. 4,801,680 at col. 5, lines 38 to 65, hereby incorporated by reference.

Besides carboxylic acid group-containing acrylic polymers, the powder coating compositions of the present invention can, and typically do, contain a second carboxylic acid group-containing material selected from the class of $C_4$ to $C_{20}$ aliphatic dicarboxylic acids, polymeric polyanhydrides, low molecular weight polyesters having an acid equivalent weight from about 150 to about 750 and mixtures thereof. This material is crystalline and is preferably a low molecular weight crystalline carboxylic acid group-containing polyester.

Also useful in powder coating compositions are acrylic, polyester and polyurethane polymers containing carbamate functional groups, such as those well known in the art. Examples of such polymers having carbamate functionality suitable for use in the powder coating compositions of the invention are described in WO Pat. No. 94/10213. Monomers for the synthesis of such polymers for use in the powder coating compositions are chosen such that the resulting polymer has a high $T_g$, that is, a $T_g$ greater than 40° C.

Curing Agents

In one preferred embodiment of the invention, the curing agent is a blocked polyisocyanate. Blocked isocyanates as curing agents for OH and primary and/or secondary amino group containing materials are well known in the art. Examples of blocked isocyanates suitable for use as curing agents in the powder coating compositions of the present invention are those described in U.S. Pat. No. 4,988,793, col. 3, lines 1 to 36, hereby incorporated by reference.

Polyepoxides as curing agents for COOH functional group containing materials are well known in the art. Examples of polyepoxides suitable for use as curing agents in the powder coating compositions of the present invention are those described in U.S. Pat. No. 4,681,811 at col. 5, lines 33 to 58, hereby incorporated by reference.

Polyacids as curing agents for epoxy functional group containing materials are well known in the art. Examples of polyacids suitable for use as curing agents in the electrodepositable coating compositions of the present invention are those described in U.S. Pat. No. 4,681,811 at col. 6, line 45 to col. 9, line 54, hereby incorporated by reference.

Polyols, that is, material having an average of two or more hydroxyl groups per molecule, can be used as curing agents for NCO functional group containing materials and anhydrides, and are well known in the art. Polyols for use in the powder coating compositions of the present invention are selected such that the resultant material has a high glass transition temperature, i.e., greater than 50° C.

Anhydrides as curing agents for epoxy functional group containing materials are well known in the art. Examples of such curing agents include trimellitic anhydride, benzophenone tetracarboxylic dianhydride, pyromellitic dianhydride, tetrahydrophthalic anhydride, and the like as described in U.S. Pat. No. 5,472,649 at col. 4, lines 49 to 52.

Aminoplasts as curing agents for OH, COOH and carbamate functional group containing materials are well known in the art. Examples of such curing agents suitable for use in the present invention are aldehyde condensates of glycoluril, which give high melting crystalline products useful in powder coatings. While the aldehyde used is typically formaldehyde, other aldehydes such as acetaldehyde, crotonaldehyde, and benzaldehyde can be used.

The organic polysiloxane which contains reactive functional groups is present in the powder coating composition in an amount of about 1 to about 15, preferably from about 3 to about 7 percent by weight based on total weight of the powder coating composition. The polymer containing functional groups is present in amounts of about 60 to about 90 percent by weight, preferably from about 70 to about 85 percent by weight based on total weight of the powder coating composition. The curing agent is present in amounts of about 5 to 15, preferably about 6 to 10 percent by weight based on total weight of the powder coating composition.

In the preferred embodiment of the invention, the powder coating composition additionally contains a polyester adduct of pentaerythritol and dodecanedioic acid (1:4). The polyester adduct is typically present in the powder coating composition of the invention in an amount of from about 1 to about 20 percent, preferably from about 5 to about 15 percent and more preferably from about 4 to about 6 percent by weight based on total weight of the powder coating composition.

The powder coating compositions of the present invention can optionally include other materials such as pigments, fillers, light stabilizers, anti-oxidants and flow control agents and anti-popping agents.

A pigment can be included in the coating in amounts of up to 60 per cent by weight based on total weight of the composition in order to give a suitable color to the resultant coating. Suitable pigments include, for example, titanium dioxide, ultramarine blue, phthalocyanine blue, phthalocyanine green, carbon black, graphite fibrils, black iron oxide, chromium green oxide, ferride yellow and quindo red.

In addition, the powder coating composition may include fumed silica or the like to reduce caking of the powder during storage. An example of a fumed silica is commercially available from Cabot Corporation under the trademark CAB-O-SIL. The fumed silica is present in amounts ranging up to 1 percent by weight based on total weight of the powder coating formulations.

For good exterior durability, the compositions also can contain ultraviolet light absorbing agents, ultraviolet light stabilizers and antioxidants. Such materials are commercially available from Ciba-Geigy under the trademarks TINUVIN and IRGANOX. The ultraviolet light absorbing agents, ultraviolet light stabilizers and antioxidants, when used, are typically present in the compositions individually in amounts up to 6 percent by weight based on weight of resin solids.

One group of suitable flow control agents are acrylic polymers such as polylauryl acrylate, polybutyl acrylate, poly(2-ethylhexyl) acrylate, poly(ethyl-2-ethylhexyl) acrylate, polylauryl methacrylate and polyisodecenyl methacrylate. The flow control agent may also be a fluorinated polymer such as an ester of polyethylene glycol or polypropylene glycol and fluorinated fatty acids, for example, an ester of polyethylene glycol of a molecular weight of over 2,500 and perfluorooctanoic acid. Polymeric siloxanes of molecular weights over 1,000 may also be used as a flow control agent, for example, poly(dimethylsiloxane) or poly(methylphenyl)siloxane. The flow control agent, when used, is present in amounts up to 5 percent by weight based on total weight of the coating composition.

Anti-popping agents can be added to the composition to allow any volatile material to escape from the film during baking. Benzoin is a preferred anti-popping agent and when used is generally present in amounts up to 3.0 percent by weight based on total weight of the powder coating composition.

The powder coating compositions are typically prepared by melt blending the ingredients. This can be accomplished by first blending the ingredients in a high shear mixer such as a planetary mixer, an then melt blending in an extruder from about 80° C. to about 130° C. The extrudate is then cooled and pulverized into a particulate material can be applied by spraying.

The particulate powder coating compositions can be applied directly to a substrate of, for example, metal such as steel or aluminum, or to a primed metal substrate. In particular, when the particulate coating compositions of the invention are applied to aluminum substrates, an improvement in filiform corrosion resistance is noted. Application can be by spraying, and in the case of a metal substrate, by electrostatic spraying which is preferred, or by the use of a fluidized bed. The coating composition can be applied as a primer or as a primer surfacer, or as a topcoat or as a finishing coat. The powder coating can be applied in a single sweep or in several passes to provide a film having a thickness after cure of from about 1 to 10 mils, usually about 2.0 to 4.0 mils.

After application of the powder coating composition, the powder coated substrate is baked at a temperature sufficient to cure the product, typically at about 250° F. to about 400° F. (121° to 204° C.) for about 1 to 60 minutes, and preferably at about 300° F. to about 350° F. (160° to 175° C.) for about 15 to 30 minutes.

The following examples illustrate the invention and should not be construed as a limitation on the scope thereof. Unless specifically indicated otherwise, all percentages and amounts are by weight.

EXAMPLES

Example 1 describes the preparation of a polysiloxane tetrol via the hydrosilylation reaction of MASIL WAX™, a polysiloxane containing silicon hydride, and trimethylol propane monoallylether. Example 2 describes the synthesis of an acid functional group containing polysiloxane which is reaction product of the polysiloxane tetrol of Example 1 and hexahydrophthalic anhydride. Example 3 describes the preparation of a polysiloxane tetrol via the hydrosilylation reaction of MASIL WAX™, a polysiloxane containing silicon hydride, and 4-vinyl-1,2-cyclohexanediol. Example 4 describes the preparation of an acid functional group containing polysiloxane which is reaction product of the polysiloxane tetrol of Example 3 and hexahydrophthalic anhydride.

Example A describes the preparation of three powder coating compositions. Examples A-1 and A-2 represent two powder coating compositions which contain varying levels of the acid functional group containing polysiloxane of Example 2, while Comparative Example A-3 represents a powder coating composition which contains no acid functional polysiloxane. The following Table 1 illustrates the advantages in filiform corrosion resistance exhibited by the compositions of A-1 and A-2 which contain the acid functional group containing polysiloxane.

Example B describes the preparation of three powder coating compositions. Examples B-1 and B-2 represent two powder coating compositions which contain varying levels of the acid functional group containing polysiloxane of Example 4, while Comparative Example B-3 represents a powder coating composition which contains no acid functional polysiloxane. The following Table 2 illustrates the advantages in filiform corrosion resistance exhibited by the compositions of B-1 and B-2 which contain the acid functional group containing polysiloxane.

Functional Group Containing Polysiloxanes

Example 1

This example describes the preparation of polysiloxane tetrol, a product of the hydrosilylation of MASIL WAX™ polysiloxane with an approximate degree of polymerization of 3 to 4, i.e., $(Si-O)_3$ to $(Si-O)_4$. The polysiloxane tetrol was prepared from the following mixture of ingredients:

| Ingredients | Equivalent Weight | Equivalents | Parts By Weight (grams) |
| --- | --- | --- | --- |
| Charge I: | | | |
| Trimethylolpropane monoallylether | 174.0 | 9.4 | 1630.0 |
| Charge II: | | | |
| MASIL WAX[1] | 156.7[2] | 9.4 | 1467.4 |
| Charge III: | | | |
| Chloroplatinic acid | | | 10 ppm |

[1]Polysiloxane-containing silicon hydride, obtained from PPG Industries, Inc.
[2]Equivalent weight based on mercuric bichloride determination.

To a suitable reaction vessel equipped with a means for maintaining a nitrogen blanket, Charge I and an amount of sodium bicarbonate equivalent to 20 to 25 ppm of total monomer solids were added at ambient conditions and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Example 2

This example describes the preparation of a polysiloxane containing COOH functional groups, a product of the polysiloxane polyol of Example 1, and a polycarboxylic anhydride. The polysiloxane having COOH functional groups was prepared from the following mixture of ingredients:

| Ingredients | Equivalent Weight | Equivalents | Parts By Weight (grams) |
|---|---|---|---|
| Charge I: | | | |
| Polysiloxane polyol of Example 1 | 183.9 | 14.51 | 2670.0 |
| Charge II: | | | |
| Hexahydrophthalic anhydride | 154.0 | 14.51 | 2235.9 |

To a suitable reaction vessel, equipped with a means for maintaining a nitrogen blanket, Charge I was added at ambient temperature and heated to 125° C. under a nitrogen blanket. Charge II was added dropwise, under mild agitation. Temperature was held at 125° C. to a stalled acid value (as measured by the depletion of anhydride), and the disappearance of anhydride as followed by IR spectroscopy.

Example 3

This example describes the preparation of polysiloxane tetrol, a product of the hydrosilylation of MASIL WAX™ polysiloxane with an approximate degree of polymerization of 3 to 4, i.e., $(Si-O)_3$ to $(Si-O)_4$. The polysiloxane tetrol was prepared from the following mixture of ingredients:

| Ingredients | Equivalent Weight | Equivalents | Parts By Weight (grams) |
|---|---|---|---|
| Charge I: | | | |
| 4-Vinyl-1,2-cyclohexanediol[1] | 142.0 | 3.1 | 438.0 |
| Charge II: | | | |
| MASIL WAX | 153.8[2] | 2.94 | 451.2 |
| Charge III: | | | |
| Chloroplatinic acid | | | 10 ppm |

[1]CAS No. 31646-64-7.

To a suitable reaction vessel equipped with a means for maintaining a nitrogen blanket, Charge I and an amount of sodium acetate equivalent to about 20 to 25 ppm of total monomer solids was added at ambient conditions and the temperature was gradually increased to 75° C. under a nitrogen blanket. At that temperature, about 5.0% of Charge II was added under agitation, followed by the addition of Charge III, equivalent to 10 ppm of active platinum based on total monomer solids. The reaction was then allowed to exotherm to 95° C. at which time the remainder of Charge II was added at a rate such that the temperature did not exceed 95° C. After completion of this addition, the reaction temperature was maintained at 95° C. and monitored by infrared spectroscopy for disappearance of the silicon hydride absorption band (Si—H, 2150 cm$^{-1}$).

Example 4

This example describes the preparation of a polysiloxane containing COOH functional groups, the reaction product of the polysiloxane polyol of Example 3 and a polycarboxylic anhydride. The polysiloxane having COOH functional groups was prepared from the following mixture of ingredients:

| Ingredients | Equivalent Weight | Equivalents | Parts By Weight (grams) |
|---|---|---|---|
| Charge I: | | | |
| Polysiloxane polyol of Example 3 | 143.7 | 5.7 | 820.0 |
| Charge II: | | | |
| Hexahydrophthalic anhydride | 154.0 | 2.9 | 439.4 |

To a suitable reaction vessel, equipped with a means for maintaining a nitrogen blanket, Charge I was added at ambient temperature and heated to 125° C. under a nitrogen blanket. Charge II was added dropwise, under mild agitation. Temperature was held at 125° C. to a stalled acid value (as measured by the depletion of anhydride), and the disappearance of anhydride as followed by IR spectroscopy.

Powder Coating Compositions

Testing Procedures

Each of the following powder coating compositions was electrostatically applied to cleaned only aluminum substrate (commercially available from ACT, Inc. as A407A1), then cured as described below. The powder coated panels were then tested for solvent resistance, haze rating, 20° gloss, and filiform corrosion resistance. Each powder coating formulation was tested for stability and thermal shock resistance.

Solvent resistance was tested according to ASTM D5402 using methyl ethyl ketone double rubs. Results are reported for appearance and mar after 200 double rubs, or, alternately, as the number of double rubs completed before breaking through the coating to the substrate. Haze rating and 20° gloss were determined using a BYK-Gardner haze-glossmeter.

Filiform corrosion resistance was tested by scribing the cured coated substrate, exposing the scribed test panel in the Copper Accelerated Acetic Acid Salt Spray ("CASS") test cabinet according to ASTM B368-68 for 6 hours, then thoroughly rinsing the panel with deionized water. These rinsed panels were subsequently exposed to an 85% relative humidity/60° C. environment for a period of up to 4 weeks. Results reported represent the average length (in millimeters) of corrosion filiments as measured outward from the scribe line.

Powder stability was tested by placing a sealed 2 ounce sample of the powder coating composition in a water bath at 40° C. for one week. The powder was then examined for caking and/or fusing together of powder particles. Thermal shock resistance was tested by soaking cured powder coated panels in water at 100° F. for 4 hours, then immediately transferring the panels to a 30° C. bath to cool. Once cooled, panels were scribed and within 30 seconds the scribed area was exposed to a 5 psi steam blast. Panels were then visually examined for blushing, water spotting and adhesion loss. Results are reported as pass/fail.

Example A

This example describes the preparation of three powder coating compositions based on a carboxylic acid functional acrylic polymer and a polyepoxide curing agent. Examples A-1 and A-2 contain varying levels of the carboxylic acid functional group containing polysiloxane of Example 2, and Comparative Example A-3 contains no carboxylic acid functional group containing polysiloxane.

| Ingredients | Example A-1 (grams) | Example A-2 (grams) | Example A-3 (grams) |
| --- | --- | --- | --- |
| TGIC[1] | 74.2 | 72.2 | 70.3 |
| SCX-819[2] | 362.2 | 377.0 | 391.8 |
| Polysiloxane of Example 2 | 25.70 | 12.90 | 0.00 |
| URAFLOW B[3] | 2.8 | 2.8 | 2.8 |
| Acid functional polyester[4] | 29.3 | 29.3 | 29.3 |
| TINUVIN 900[5] | 5.2 | 5.2 | 5.2 |
| EPON 1001F[6] | 17.2 | 17.2 | 17.2 |
| BYK-361[7] | 2.6 | 2.6 | 2.6 |
| TROY-570[8] | 2.3 | 2.3 | 2.3 |

[1] Triglycidylisocyanurate commercially available from CYTEC Corp.
[2] Acid functional acrylic polymer, commercially available from S.C. Johnson Co.
[3] Benzoin, commercially available from Monsanto Chemical Co.
[4] Pentaerithrytol/dodecanedioic acid (1:4 equivalents ratio).
[5] 2-(2'-hydroxy-benzotriazol-2-yl)-4,6-bis(methyl-1-phenylethyl)phenol, an ultraviolet absorber light stabilizer commercially available from Ciba-Geigy Corp.
[6] Polyglycidyl ether of Bisphenol A, having an equivalent weight of 1000, commercially available from Shell Oil and Chemical Co.
[7] Polyamide flow control additive commercially available from BYK Chemie USA
[8] Silicone/amide flow control aid, commercially available from Troy Chemical Corp.

The ingredients of each of the Examples A-1, A-2 and Comparative Example A-3 immediately above were mixed via typical powder compounding techniques. Each powder composition was electrostatically applied to cleaned only aluminum substrate then cured at 340° F. (171° C.) for 20 minutes. The powder coated panels were then tested as described above for solvent resistance, haze rating, 20° gloss and filiform corrosion resistance. Each powder coating formulation was tested as described above for stability and thermal shock resistance.

The following Table 1 illustrates the advantages of improved filiform corrosion resistance, while maintaining other performance properties, obtained by the incorporation of the carboxylic acid functional group containing polysiloxane into the powder coating composition.

TABLE 1

| Test performed: | Example A-1 | Example A-2 | Example A-3 |
| --- | --- | --- | --- |
| Solvent Resistance | Pass, very slight mar | Pass, slight mar | Pass, slight mar |
| 20° Gloss | 98 | 113 | 116 |
| Haze Rating | 537 | 470 | 516 |
| Stability 32° C./1 wk. | Slight cake | Pass | Pass |
| Thermal shock | Pass | Pass | Pass |
| Filiform Corrosion | 4 wks: 2 mm, very low density | 4 wks: 2 mm, very low density | 4 wks: 4 mm, medium density |

Example B

This example describes the preparation of three powder coating compositions based on an epoxy-functional acrylic polymer and a carboxylic acid curing agent. Examples B-1 and B-2 contain varying levels of the carboxylic acid functional group containing polysiloxane of Example 4, and Comparative Example B-3 contains no carboxylic acid functional group containing polysiloxane.

| Ingredients | Example B-1 (grams) | Example B-2 (grams) | Example B-3 (grams) |
| --- | --- | --- | --- |
| GMA acrylic copolymer[1] | 400.0 | 400.0 | 400.0 |
| EPON 1001F | 19.0 | 19.0 | 19.0 |
| URAFLOW B | 3.0 | 3.0 | 3.0 |
| TINUVIN 900 | 2.0 | 2.0 | 2.0 |
| MODAFLOW II[2] | 2.5 | 2.5 | 2.5 |
| Dodecanedioic acid | 80.0 | 80.0 | 80.0 |
| Polysiloxane of Example 4 | 30.0 | 60.0 | — |
| Acid functional polyester-polyurethane[3] | 104.0 | 104.0 | 104.0 |

[1] Almatex M207S available from Reichold Chemicals, Inc
[2] Ethylacrylate/2-ethylhexylacrylate copolymer available from Monsanto Chemical Company.
[3] Hexanediol/isophorone diisocyanate/dodecanedioic acid (1.1:0.1:1.4 equivalents ratio).

The ingredients of each of the Examples B1, B-2 and Comparative Example B-3 immediately above were mixed via typical powder compounding techniques. Each powder composition was electrostatically applied to cleaned only aluminum substrate then cured at 340° F. (171° C.) for 20 minutes. The powder coated panels were then tested as described above for solvent resistance, 20° gloss and filiform corrosion resistance. Each powder coating formulation was tested as described above for stability and thermal shock resistance.

The following Table 2 illustrates the advantages of improved filiform corrosion resistance, while maintaining other performance properties, obtained by the incorporation of the carboxylic acid functional group containing polysiloxane into the powder coating composition.

TABLE 2

| Test performed: | Example B-1 | Example B-2 | Example B-3 |
| --- | --- | --- | --- |
| Methyl ethyl ketone rubs | 100+ | 100+ | 100+ |
| 20° Gloss | 75 | 93 | 72 |

TABLE 2-continued

| Test performed: | Example B-1 | Example B-2 | Example B-3 |
| --- | --- | --- | --- |
| Stability 32° C./1 wk. | Pass | Pass | Pass |
| Thermal shock | Pass | Pass | Pass |
| Filiform Corrosion | 5–10 mm | 5–10 mm | 10–20 mm |

We claim:

1. In a powder coating composition comprising a sold particulate film-forming mixture of an acrylic polymer containing reactive COOH functional groups and a curing agent having functional groups reactive with the functional groups of the polymer wherein the improvement comprises an organic polysiloxane having reactive functional groups, said polysiloxane having the following general formula:

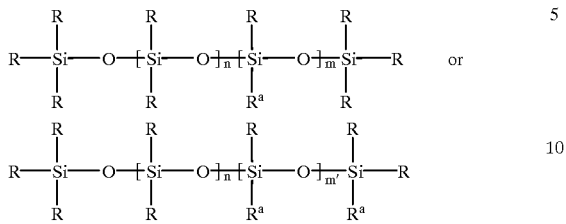

where m is at least 1; m' is 0 to 50; n is 0 to 50; the R groups are monovalent hydrocarbon groups connected to the silicon atoms; $R^a$ has the following structure:

$$R_1—O—X$$

where $R_1$ is alkylene, oxyalkylene or alkylene aryl; and X is a moiety containing a at least one reactive COOH functional group, wherein at least a portion of X contains two or more COOH functional groups.

2. The powder coating composition of claim 1 wherein n+m and n+m' is 2 or 3.

3. The powder coating composition of claim 1 wherein X is a moiety which contains COOH functional groups, and the curing agent contains epoxy functional groups.

4. The powder coating composition of claim 1 wherein the organic polysiloxane is the reaction product of the following:

(a) a polysiloxane polyol of the following general formula:

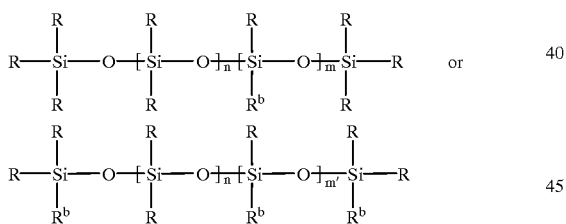

where m is at least 1; m' is 0 to 50; n is 0 to 50; the R groups are monovalent hydrocarbon groups connected to the silicon atoms; $R^b$ has the following structure:

$$R_1—O—Y$$

wherein $R_1$ is alkylene, oxyalkylene or alkylene aryl; and the moiety Y is H, mono-hydroxy-substituted alkylene or oxyalkylene, or $$R_2—(CH_2—OH)_p \quad \text{wherein p is 2 or 3; and}$$

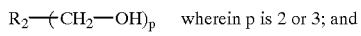

wherein $R_2$ is $CH_2—C—R_3$ when p is 2 and $R_3$ is $C_1$ to $C_4$ alkyl, or $$R_2—(CH_2—OH)_p \quad \text{wherein p is 2 or 3; and}$$

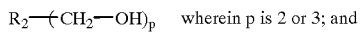

where $R_2$ is $CH_2—C—R_3$ when p is 2 and $R_3$ is $C_1$ to $C_4$ alkyl, or $R_2$ is $CH_2—C—$ when p is 3, wherein at least a portion of Y is $$R_2—(CH_2—OH)_p; \text{ and}$$

(b) at least one polycarboxylic acid or anhydride.

5. The powder coating composition of claim 4 wherein (b) is an anhydride.

6. The powder coating composition of claim 5 wherein the anhydride is selected from the group consisting of hexahydrophthalic anhydride, methyl hexahydrophthalic anhydride, phthalic anhydride, trimellitic anhydride, succinic anhydride, alkenyl succinic anhydride and substituted alkenyl succinic anhydride, and mixtures thereof.

* * * * *

UNITED STATES PATENT AND TRADEMARK OFFICE
CERTIFICATE OF CORRECTION

PATENT NO. : 6,046,276
DATED : April 4, 2000
INVENTOR(S) : Ronald R. Ambrose, Truman F. Wilt, Anthony M. Chasser and John R. Schneider It is certified that error appears in the above-identified patent and that said Letters Patent is hereby corrected as shown below:

Column 15, Claim 1, line 14, the first "R" in that line should be --$R^a$--.

Column 16, Claim 4, delete lines 15-20.

Signed and Sealed this

Twenty-seventh Day of February, 2001

Attest:

NICHOLAS P. GODICI

*Attesting Officer*  *Acting Director of the United States Patent and Trademark Office*